2,929,841

PROCESS FOR THE PRODUCTION OF MONO-AMIDES OF DICARBOXYLIC ACIDS

Henry C. Godt, Jr., St. Louis, Mo., assignor to Monsanto Chemical Company, St. Louis, Mo., a corporation of Delaware No Drawing. Application July 14, 1958
Serial No. 748,141

6 Claims. (Cl. 260—534)

This invention relates to the production of monoamides of aliphatic dicarboxylic acids.

It has been discovered that monoamides of aliphatic dicarboxylic acids, having the formula,

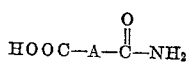

wherein A is a divalent open-chain aliphatic group, and preferably a divalent open-chain saturated aliphatic hydrocarbon group, containing from 2 to 10 carbon atoms, can be readily and conveniently prepared by reacting nitrous acid with the corresponding monoamidoximes, i.e., amino-hydroxyimino aliphatic carboxylic acids having the formula,

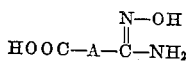

wherein A has the same meaning as above. The preferred monoamidoximes and the process for making same are described in copending application Serial No. 502,730, filed April 20, 1955, now Patent No. 2,851,489.

The process of this invention can be carried out employing an amount of nitrous acid which is less than a stoichiometric quantity, and, of course, such a process will provide for a lesser yield of the desired monoamide. The use of more than an equimolecular proportion of nitrous acid provides for a more complete reaction, but when the nitrous acid is used in excess of about two mols of acid per mole of monoamidoxime, no advantage is to be obtained, for such an excess does not improve the efficiency of the reaction.

One way to provide nitrous acid for the process of this invention is to form it in situ by the reaction of an equivalent amount of a strong inorganic acid, such as sulfuric acid, phosphoric acid, hydrochloric acid, hydrobromic acid, hydroiodic acid, and the like, with a salt of nitrous acid and preferably a water-soluble salt of nitrous acid, such as sodium nitrite, potassium nitrite, lithium nitrite, barium nitrite, calcium nitrite, and the like.

The process of this invention is preferably carried out at a temperature of from about 0° C. to 25° C., but higher temperatures can be employed, if desired, when a sufficient excess of nitrous acid is employed to make up for that which decomposes at the higher temperatures. For most practical operation of the process of this invention, it is desired, therefore, to carry out the process at a temperature below about 25° C. However, since reaction does occur above temperatures of about 25° C., it is not desired to limit the process of this invention to a maximum temperature of 25° C.

After the oxidative hydrolysis is complete, the monoamide may be recovered from the reaction mixture by any method well known to those skilled in the art. Preferably, the reaction mixture is cooled to about 0° C. and the product is recovered by filtration.

The following examples, in which all "parts" are parts by weight, are given to illustrate the preparation of monoamides of dicarboxylic acids in accordance with the method of this invention; however, the specific details of these examples are not to be taken as limitations upon the invention.

Example 1

There are dissolved, in a suitable reaction vessel, 8 parts of adipomonoamidoxime in 100 parts of a dilute solution of HCl (6%). The resulting solution is cooled to 0° C. and an aqueous solution containing 4.1 parts of sodium nitrite is added thereto. After evolution of the gas has ceased, the resulting aqueous medium is stirred for 6 hours at 10° C., whereupon a white precipitate forms. The mixture is cooled to 0° C. and filtered. The recovered product, adipamic acid, has a melting point of 161–162° C.

Example 2

Ten parts by weight of glutaromonoamidoxime are dissolved in 29 parts of a dilute aqueous solution of HCl (10%). The resulting solution is cooled to about 15° C. and an aqueous solution containing 6.7 parts of potassium nitrite is added thereto. When the gas has ceased to evolve, the aqueous solution is stirred at 15° C. until a precipitate appears. The mixture is then cooled to 0° C. and filtered. The product is identified as glutaromonoamide (glutaramic acid).

Example 3

The process of Example 1 is repeated, except that a stoichiometrically equivalent amount of a dilute solution of phosphoric acid is used in place of HCl solution. A good yield of adipomonoamide (adipamic acid) is obtained.

Example 4

The process of Example 1 is repeated, except that an equivalent amount of pimelomonoamidoxime is substituted for the adipomonoamidoxime. A high yield of pimelomonoamide (pimelamic acid) is obtained.

Other amidoximes, such as succinomonoamidoxime, suberomonoamidoxime, azelamonoamidoxime, etc., can be employed in the process of this invention to yield the corresponding monoamides of dicarboxylic acids.

The above description is intended as an illustration of the invention, and not as a limitation thereon, since many variations and deviations from the process described above will be obvious to those skilled in the art. For example, greater quantities of the reactants can be employed and salts of nitrous acid other than the sodium salt can be employed for a source of nitrous acid. Likewise, the equivalent proportions of sulfuric, phosphoric, hydrobromic, etc., acids can be substituted for the hydrochloric acid employed in the illustration of this invention with substantially equivalent results. Also, other means for providing nitrous acid may be employed as a modification of the process of this invention. For example, the nitrous acid can be formed outside in a separate reaction vessel and then introduced into the reaction vessel containing the adipomonoamidoxime.

This application is a continuation-in-part of application Serial No. 502,734, filed April 20, 1955, now abandoned.

What is claimed is:

1. The process for preparing a monoamide of a dicarboxylic acid having the formula,

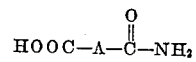

wherein A is a divalent open-chain saturated aliphatic hydrocarbon group containing from 2 to 10 carbon atoms, which comprises reacting the corresponding monoamidoxime with nitrous acid.

2. The process for preparing a monoamide of a dicarboxylic acid having the formula,

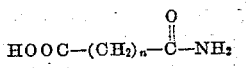

wherein $n$ is an integer of from 2 to 10, which comprises dissolving an amidoxime of the formula,

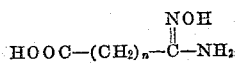

wherein $n$ has the same meaning as above, in an aqueous medium containing a mineral acid and adding a water-soluble nitrite thereto at a temperature of from 0° C. to 25° C.

3. The process of claim 2 wherein the amidoxime is adipomonoamidoxime.

4. The process of claim 3 wherein the mineral acid is HCl and the water-soluble nitrite is sodium nitrite.

5. The process of claim 2 wherein the amidoxime is glutaromonoamidoxime.

6. The process of claim 2 wherein the amidoxime is pimelomonoamidoxime.

References Cited in the file of this patent

UNITED STATES PATENTS 2,423,180    Doumani et al. _____ July 1, 1947

OTHER REFERENCES

Degering: Outline of Org. Nitrogen Compounds (1950), p. 188.